United States Patent [19]

Sayegh

[11] Patent Number: 5,293,442
[45] Date of Patent: Mar. 8, 1994

[54] CRUSH-RESISTANT HIGH-STRENGTH BUFFERED OPTICAL WAVEGUIDE FIBER CABLE

[75] Inventor: Emile G. Sayegh, Austin, Tex.

[73] Assignee: W. L. Gore & Associates, Inc., Newark, Del.

[21] Appl. No.: 915,970

[22] Filed: Jul. 15, 1992

[51] Int. Cl.⁵ .............................................. G02B 6/44
[52] U.S. Cl. ..................................... 385/102; 385/100; 385/107; 385/108
[58] Field of Search ............... 385/100, 101, 102, 107, 385/108, 128

[56] References Cited

U.S. PATENT DOCUMENTS

| | | | |
|---|---|---|---|
| 4,105,284 | 8/1978 | Olshansky | 385/127 |
| 4,374,608 | 2/1983 | Anderson | 350/96.23 |
| 4,705,353 | 11/1987 | Wagoner | 385/101 |
| 4,896,940 | 1/1990 | Kathiresan et al. | 385/112 |
| 5,002,359 | 3/1991 | Sayegh | 385/107 |

FOREIGN PATENT DOCUMENTS

| | | |
|---|---|---|
| 089226 | 9/1983 | European Pat. Off. |
| 56-156805 | 3/1981 | Japan . |
| WO 9207366 | 4/1992 | PCT Int'l Appl. |
| 2242035 | 9/1991 | United Kingdom . |

Primary Examiner—Rodney B. Bovernick
Assistant Examiner—Stephen W. Barns
Attorney, Agent, or Firm—Samuels, Gary A.

[57] ABSTRACT

A polymer-insulated crush-resistant high-strength optical waveguide fiber cable buffered by a braided layer of porous polytetrafluoroethylene fibers to provide strength, a low thermal expansion coefficient buffer, and strong environmental protection.

9 Claims, 1 Drawing Sheet

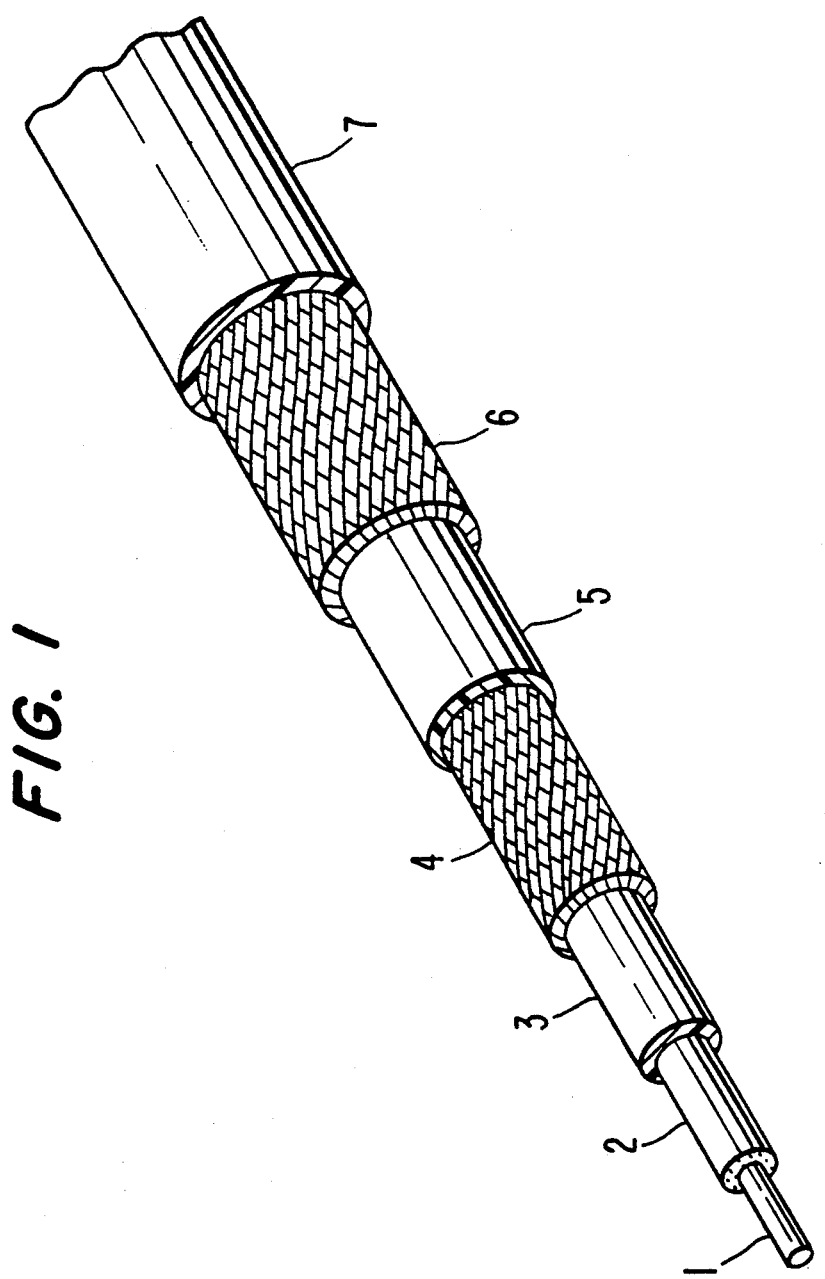

CRUSH-RESISTANT HIGH-STRENGTH BUFFERED OPTICAL WAVEGUIDE FIBER CABLE

FIELD OF THE INVENTION

This invention relates to the field of optical waveguide fiber cables, particularly those having silica-based or glass optical fiber cores.

BACKGROUND OF THE INVENTION

Optical communication glass fibers are made from glass such as quartz glass or doped silica glass and are extremely small in diameter and hence weak in strength. Under normal conditions of use, such fibers may be subjected to considerable bending strain and other tensile forces during the cable manufacturing process and while being pulled through ducts and otherwise bent, twisted, or manipulated during reeling or during installation. In the transmission of light signals through optical fiber cables, the signals are readily attenuated in response to relatively small distortions in the cable, such as those caused by the above stresses, sharp bends or roughness in the surface of the fiber to produce light signal distortions or attenuation at an unacceptable level.

To confine the optical signals inside the signal-transmitting fiber core, a glass or silica fiber core is coated with a glass cladding or an amorphous fluoropolymer coating always of a lower refractive index from that of the optical fiber. The coating on the glass cladding may optionally be a silicone, acrylic, polyimide, or other release agent and a polymer coating, which is usually a hard or soft polymer coating which is coated on the fiber from a melt or a solution of the polymer, or extruded onto the fiber. Many hard and soft plastic coatings have been tried and some of these have been applied in layers for varying purposes as disclosed in U.S. Pat. Nos. 4,113,350, 4,105,284, 4,380,367, 4,072,400, 3,930,103, 4,463,329, 4,099,837, and 4,642,265, of which the background discussion contained therein is hereby incorporated into this application. Another excellent discussion of optical fiber packaging and buffering is provided by a paper in the Bell System Technical Journal, in Volume 54, No. 2, pages 245–262, February 1975, by D. Gloge.

To protect a glass or amorphous fluoropolymer-clad hard polymer-coated glass fiber core, a layer of porous polytetrafluoroethylene (PTFE) tape may be adhered to the hard polymer coating layers by a heat-resistant adhesive coated on the inside of the porous PTFE tape. The soft porous PTFE buffering layer can be covered by jacketing, such as an inner jacket of high-temperature polymer in the form of wrapped laminated tape, a dipped coating from a solvent, or by an extruded melt. A strength member sheath can then be applied followed by an outer jacket of the same polymer materials as the inner jacket or from other materials for environmental protection. This cable is described in U.S. Pat. No. 5,002,359.

It would be desirable, however, to have a cable having greater crush resistance along with higher tensile strength, good flex, and improved thermal isolation of the optical waveguide fiber cable.

SUMMARY OF THE INVENTION

The invention provides an optical fiber cable assembly comprising a light-transmitting fiber core comprising an optical fiber surrounded by a cladding of lower refractive index than the optical fiber and a protective layer of higher refractive index than the cladding; a braided fluorocarbon fiber buffer layer, preferably of expanded polytetrafluoroethylene; an inner jacket of heat resistant polymer surrounding the braided fiber buffer layer; a braided fiber strength member surrounding the inner jacket; and an outer protective jacket.

The cable of the invention has stable signal carrying characteristics under severe conditions as a result of controlled adhesion of materials of low coefficient of expansion to the core of the cable to minimize or remove stress when the cable is bent or heat cycled in use. In this invention, the expansion and contraction of the glass fiber during thermal cycling will not be affected by the contraction and expansion of the buffer layer. This is owing to the use of porous PTFE, which has a low thermal expansion coefficient as a buffer, and which has a flexible hinge like microstructure which prevents the trapping of the fiber which would result in creation of microbends in the glass fiber. The porous PTFE braided buffer is forgiving enough and has low resilience so that it will conform to the most relaxed position of the glass fiber. The braid also provides a hinge-like structure to the cable. The cable is also protected from a hostile environment by proper choice of and careful application of strong environmentally resistant materials.

BRIEF DESCRIPTION OF THE DRAWINGS

FIG. 1 is a cross-sectional perspective view of an optical waveguide cable of the invention with various layers partially removed to show the structure of the cable.

DETAILED DESCRIPTION OF THE INVENTION

The invention is described now with reference to the figure to more carefully delineate the details and materials useful in the invention.

FIG. 1 shows a buffered insulated optical waveguide fiber cable comprising an optical fiber 1 of doped silica clad with a pure silica or amorphous fluoropolymer cladding 2 and a polyimide, acrylic, polyether ether ketone or other hard polymer coating 3 on the cladding. The amorphous fluoropolymer may be a homopolymer of bis(trifluoromethyl)difluorodioxole or a copolymer of the dioxole with tetrafluoroethylene or other fluorinated ethylenes. Other forms of doped glass and silica may be used for fiber 1 and a glass cladding may be used instead of silica for cladding 2. Cladding 2 always has a lower refractive index than light transmitting fiber 1. Other equally hard and protective polymer materials which usually have a higher refractive index than cladding 2 may substitute for the polyimide of layer 3. The above three layers are known in the art and comprise the starting material for the cable of the invention.

The above three-layer core is covered by a layer of braided porous fluorocarbon fibers 4, preferably porous expanded PTFE fibers, such as RASTEX ® expanded PTFE fibers, which are braided around the outside hard polymer coating 3 of the clad core 1. The porous expanded PTFE material utilized in the PTFE fibers is that disclosed and described in U.S. Pat. Nos. 3,953,566, 4,187,390, 3,962,153, and 4,096,227. The fibers before being braided, may be dip coated with thermoplastic fluorinated ethylene-propylene polymer emulsion, for example, to provide an adhesive coating on the fibers, which when heated moderately to a point below the melting point of the coating polymers will adhere to layer 3. Other thermoplastic polymers useful to bond the fibers to layer 3 may include polymers of perfluoroalkoxy tetrafluoroethylene, or polyvinyl fluoride, for example, or may be a polyester or an organopolysiloxaneimide polymer (block copolymers of diorgano siloxanes and polyimide units), polyether ether ketone, or polyurethane.

The porous PTFE polymer braid 4 provides crush resistance to the optical waveguide fiber core, good decoupling properties, and better thermal isolation in that more air is present, which has a very low dielectric constant. The braid also allows good flex properties since the braid can move during bending of the cable, and there is less potential damage to the core (layers 1 +2 +3) during the manufacturing process. The braid also has high tensile strength and load-sharing properties and also serves as a soft buffer layer between the core and the outer protective layers.

The porous expanded PTFE fiber braid 4 may be enclosed in a protective sealing jacket 5. Jacket 5 comprises a protective polymer material, such as Kapton ® polyimide tape, polyether ether ketone, organopolysiloxane-imide, polyester, full-density PTFE tape (density about 1.8-2.2), or a copolymer of ethylene and PTFE, for example.

A protective strength member 6 of tough polymer strands was then braided (or could be unbraided strands) around first jacket 5. The strands of braided strength member were chosen from among Kevlaro ® polyester, RASTEX ® PTFE, polyimide or Vectran ® naphthalene based aromatic copolyester, for example.

The cable was then enclosed in a second jacket 7 for protection against the environment. Second jacket 7 was made from polyvinyl chloride, rubber, silicone rubber, urethane rubber, or full density PTFE tape and could be applied by extrusion in the case of thermoplastic materials or by tape wrapping in the case of non-thermoplastic materials.

To protect a waveguide fiber cable from a chemical environment and/or a thermally and mechanically abusive environment, porous expanded PTFE braided fiber layer 4 was optionally adhered to the optical fiber core with a fluorinated polymer adhesive, full-density PTFE tape applied and sintered to give jacket 5, braided strength member 6 manufactured from RASTEX PTFE fiber, and full-density PTFE tape helically wound around the braided strength member and sintered to a unitary material to provide second jacket 7—an all PTFE-protected cable.

I claim:

1. An optical fiber cable assembly comprising:
   (a) a light-transmitting fiber core comprising an optical fiber surrounded by a cladding of lower refractive index than said fiber and a protective layer of higher refractive index than said cladding;
   (b) a braided expanded porous polytetrafluoroethylene layer surrounding said core;
   (c) an inner jacket of heat resistant polymer surrounding said braided fiber buffer layer;
   (d) a braided fiber strength member surrounding said inner jacket; and
   (e) an outer protective jacket.

2. An assembly of claim 1 wherein said optical fiber comprises glass or silica.

3. An assembly of claim 1 wherein said protective layer of higher refractive index than said cladding is selected from the group consisting of polyamide, acrylic, and polyether ether ketone polymers.

4. An assembly of claim 1 wherein said braided fiber buffered layers coated with a thermoplastic polymer adhesive.

5. An assembly of claim 4 wherein said adhesive comprises a fluorocarbon polymer or a polyester.

6. An assembly of claim 1 wherein said braided fiber strength member comprises braided fibers selected from the group polyester, polytetrafluoroethylene, polysulfone, and polyamide fibers.

7. An assembly of claim 1 wherein said heat resistant polymer inner jacket is selected from the group polyimide tape, polyether ether ketone, organopolysiloxane-imide, polyester, full density polytetrafluoroethylene tape, tetrafluoroethylene-hexafluoropropylene copolymer, ethylene-tetrafluoroethylene copolymer, and perfluoroalkoxy tetrafluoroethylene.

8. An assembly of claim 1 wherein said protective outer polymer jacket is selected from the group polyvinyl chloride, rubber, silicone rubber, urethane rubber, full density polytetrafluoroethylene tape, tetrafluoroethylene-hexafluoropropylene copolymer, ethylene-tetrafluoroethylene copolymer, and perfluoroalkoxy tetrafluoroethylene.

9. An assembly of claim 1 wherein said protective layer, said braided fiber strength member, and said protective polymer jacket comprise polytetrafluoroethylene.

* * * * *